P. N. JONES.
ELECTRIC MOTOR CONTROL.
APPLICATION FILED SEPT. 23, 1912.
1,061,299.
Patented May 13, 1913.
3 SHEETS—SHEET 1.
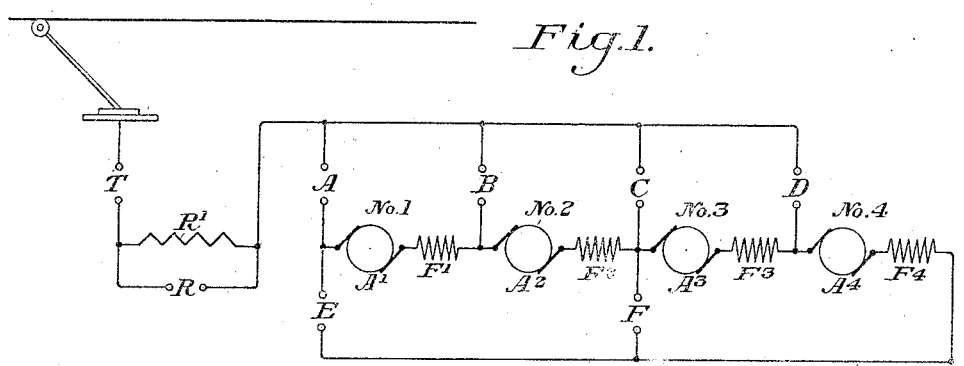
Fig. 1.
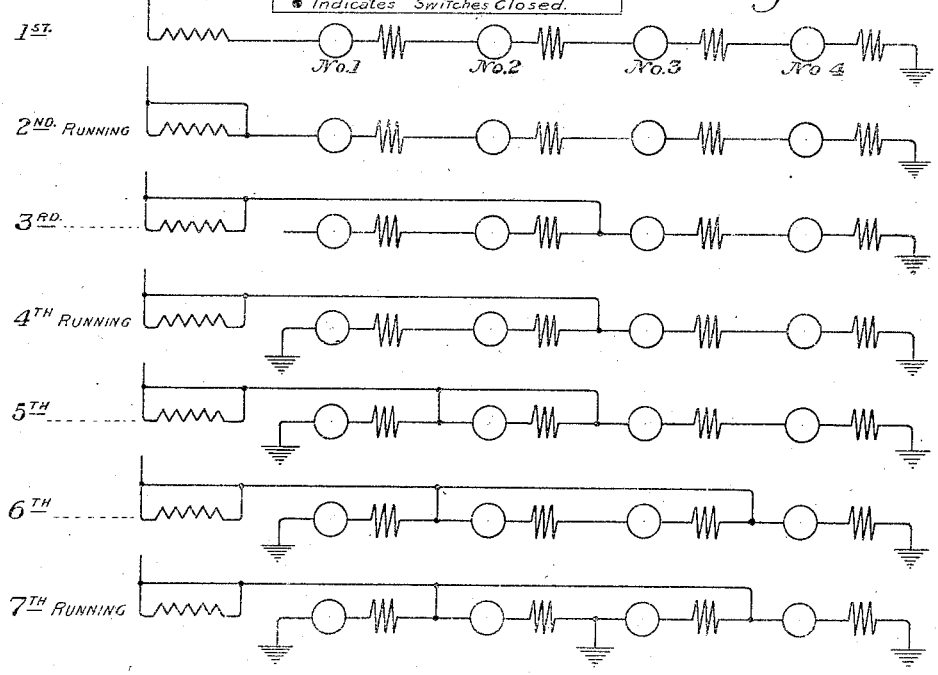
Fig. 2.
Fig. 3.
WITNESSES
R A Balderson
Jesse B. Heller
INVENTOR
P. N. Jones
by Bakewell, Byrnes, Parmelee,
Attys

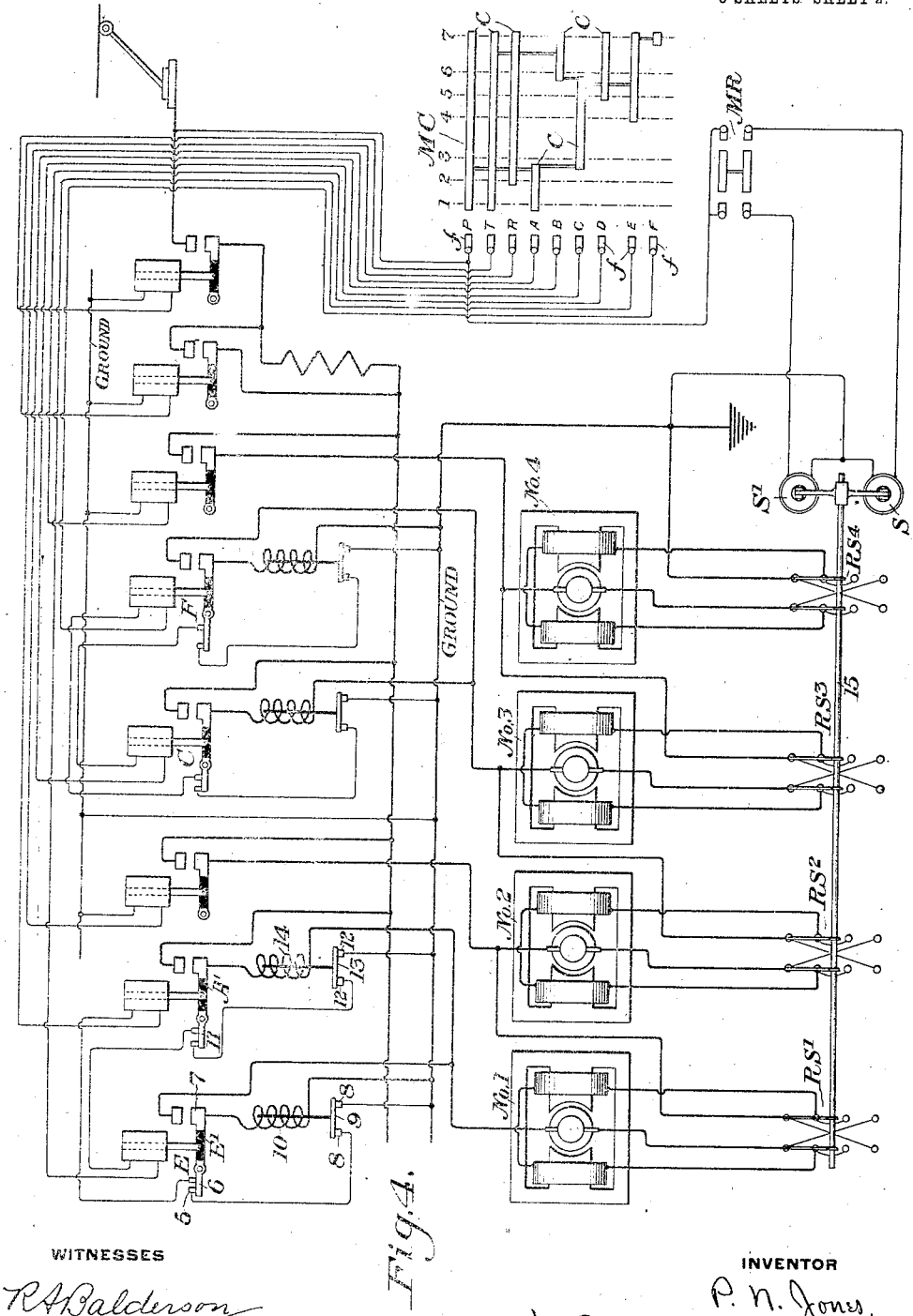

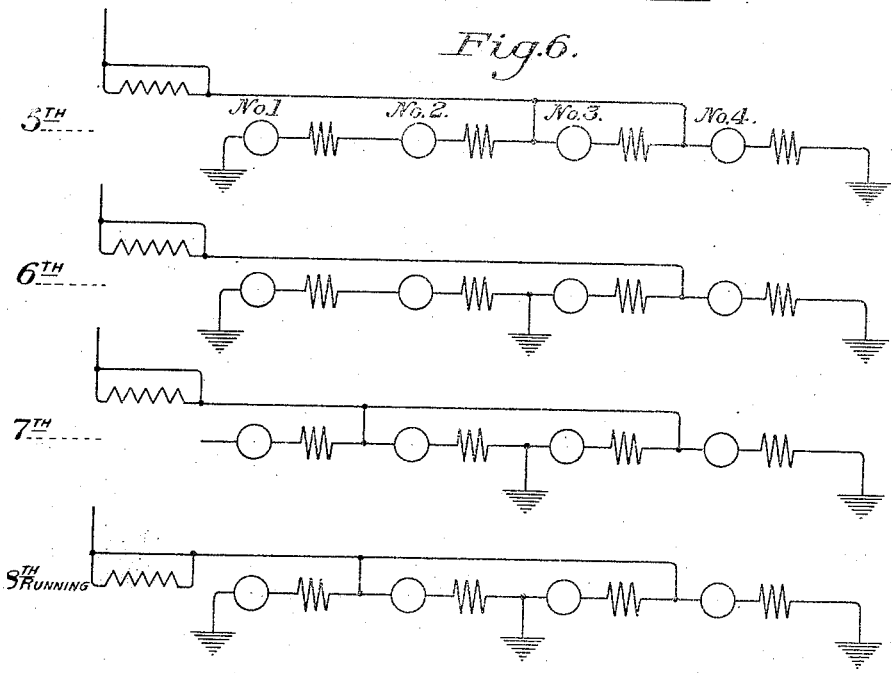

UNITED STATES PATENT OFFICE.

PEARL N. JONES, OF PITTSBURGH, PENNSYLVANIA.

ELECTRIC-MOTOR CONTROL.

1,061,299.  Specification of Letters Patent.  Patented May 13, 1913.

Application filed September 23, 1912. Serial No. 721,788.

*To all whom it may concern:*

Be it known that I, PEARL N. JONES, a resident of Pittsburgh, in the county of Allegheny and State of Pennsylvania, have invented a new and useful Improvement in Electric-Motor Control, of which the following is a full, clear, and exact description, reference being had to the accompanying drawings, forming part of this specification, in which—

Figure 1 is a general diagram illustrating my invention; Fig. 2 is a table or diagram indicating the positions of the several switches in the different control steps or notches; Fig. 3 is a diagram showing the motor circuits in the different control steps or notches; Fig. 4 is a detail wiring diagram; Fig. 5 is a view similar to Fig. 2, but showing a modification; and Fig. 6 is a diagram showing the modified circuit connections effected by the modification of Fig. 5.

My invention has relation to certain new and useful improvements in the control of electric motors, and more particularly, to improvements in series-parallel control systems therefor.

The object of my invention is to provide a method of, and means for, controlling a plurality of electric motors, especially applicable to series-wound car motors, and which will greatly simplify the car wiring and circuit connections; which will obviate either entirely or to a very large extent the breaking of the initial series connections of the motors; and which effectively guards against short circuits or destructive arcing at the switch contacts.

A further object of my invention is to largely eliminate the use of external resistance, and thereby decrease the current loss in starting the motors.

In accordance with the preferred form of my invention, a plurality of motors are connected in series for the first running position and are changed to parallel relation without breaking the initial series connections, by providing parallel circuit connections so arranged as to reverse the flow of current through both the fields and the armatures of some of the motors. For the intermediate steps, the motors are connected in series-parallel groups, and one or more of the motors are short-circuited without breaking their series connections.

My invention also comprises various other features which will be hereinafter fully described.

Referring first to the general diagram shown in Fig. 1, I have illustrated four series-wound motors marked, respectively, 1, 2, 3 and 4, connected in series between the trolley and ground. The armatures of the motors are designated $A'$, $A^2$, $A^3$ and $A^4$, respectively, and their field windings are respectively designated as $F'$, $F^2$, $F^3$ and $F^4$. A, B, C, D, E, F, R and T designate switches or switch contacts which effect the various circuit changes employed in the system of control. The arrangement and mode of connection of these switches will be best understood by an examination of Fig. 1.

The table shown in Fig. 2 indicates the positions of these switches at the different controller notches, the latter being indicated in the column at the left-hand side of the table, and the columns of the table being headed by letters corresponding to the letters given the different switches in Fig. 1. The presence of a black dot in any square of the table indicates that the switch designated at the head of the column in which it occurs is closed, while the absence of such a dot indicates that the switch at the head of the column is open.

At the first controller notches, the switch A and switch T are closed, the other switches being open. The closing of these two switches causes the current to flow through the resistance $R'$ and through the four motors in series to ground, as indicated in the first position shown in Fig. 3. This is a starting position or notch only. The first running position is that shown as the second position of Fig. 3, in which the resistance has been short-circuited by the closing of the switch R.

At the third notch, switch A is opened, the switch C is closed, switches R and T remaining closed, the switch A having been opened an instant after the switch C is closed. In this position motors 1 and 2 are short-circuited, and motors 3 and 4 are in series. At the fourth notch, switch E is closed, the other switches remaining in position 3. The closing of switch E establishes a ground connection for motors 1 and 2, and these motors are now in series-parallel with the motors 3 and 4, but with the current flowing through them in the reverse direction.

At the next or fifth position, switch B is closed, switches C, E, R and T remaining closed, as before, the closing of the switch B acting to form a short circuit for motor No. 2. Motor No. 1 is now in parallel relation to motors 3 and 4, which are in series, but with the current still flowing in the reverse direction through motor No. 1. In the sixth position, switch D is closed and switches B, E, R and T remain closed, switch C having been opened an instant after closing switch D; and the motors 2 and 3 are now short-circuited, and motors 1 and 4 are connected in parallel. In the seventh position, switches B, D, E, F, R and T are closed, the closing of the switch F establishing an additional ground connection between motors 2 and 4, and the four motors are connected in parallel. Positions 2, 4, 7 are running positions: the other positions are transition positions.

It will be seen that in effecting the change from full series to full parallel relation of the four motors, the initial series connections between the motors has not been broken, but that these connections have been maintained and that the various changes have been effected by short-circuiting one or more motors and by establishing circuit connections of a character to cause the current to flow through both the fields and armatures of some of the motors in a direction reverse to that in which it flowed in the series position. My invention therefore makes it unnecessary to bring the terminals of each motor element to the controlling switches, thereby greatly simplifying the controlling apparatus, as well as the car wiring. In some cases, however, as in the case of an especially heavy car equipment, it may be advisable to interpose an additional step between the steps 6 and 7 of Fig. 3, and in which, instead of passing directly from the condition of position 5 to the full parallel relation of position 7, the motors are successively connected in parallel. This modification is illustrated on Sheet 3 in Figs. 5 and 6. In this form, the first four steps are substantially the same as the first four steps in the arrangement illustrated in Figs. 1, 3 and 4. At the fifth step, however, the switches C, D, E, R and T are closed, the other switches being open. This gives the circuit conditions represented in the fifth position of Fig. 6, motors 1 and 2 having the current reversed therethrough and being connected in series, motor No. 4 being in parallel with motors 1 and 2, and motor No. 3 being short-circuited. On the sixth step, the switches D, E, F, R and T are closed, which places motors 3 and 4 in parallel with each other, with motors 1 and 2 short-circuited. In the seventh step, switches B, D, F, R and T are closed, giving the circuit conditions shown in the seventh position of Fig. 6, in which motors 2, 3 and 4 are in parallel and motor No. 1 is cut out. In the eighth position, switches B, D, E, F, R and T are closed, which places the four motors in parallel. I do not limit myself to this particular sequence of closing the switches, since they may be manipulated in other ways to effect the three main running positions.

Any suitable control apparatus may be employed for carrying out my improved method of control. I have, however, designed apparatus for this purpose, which is illustrated diagrammatically in Fig. 4, and which will now be described. In this figure, the corresponding parts are given the same reference characters as in the other figures, but are shown more in detail. In this figure, MC designates a master controller, comprising the usual rotary drum having thereon a plurality of contacts $c$, adapted to connect the contact fingers $f$ in various ways in the different positions of the drum. The several switches before referred to are here shown as consisting each of a solenoid, the plungers of the solenoid being connected to the movable contact members of the switches; and the contacts of the master controller being arranged to control the currents of the solenoids.

By referring to Fig. 1, it will be seen that it is necessary to so arrange the switches A and E and also the switches C and F as to provide against any possibility of the two switches of either pair being closed at the same time, as such closure would effect a direct connection from trolley to ground. For this purpose, switches A and E and switches C and F are electrically interlocked. This is effected as follows:

The solenoid winding of switch A is carried through a pair of separated contacts 5, which are arranged to be bridged by a contact 6, carried by the lever E′ of the switch E, and which lever also carries the movable contact 7 of that switch. This circuit is further carried through the two separated contacts 8, which are arranged to be bridged by movable contact 9, having a plunger which extends within a solenoid winding 10, which is connected in series between the contact 7 and ground. In a similar manner, the winding of the solenoid E is carried through the two contacts 11, arranged to be bridged by the contact lever A′, of switch A, and also through contacts 12, arranged to be bridged by a movable contact 13, whose actuating plunger extends within a solenoid winding 14, which is in series between the movable contact of switch A and the armature of motor No. 1.

It will be readily seen that by reason of the foregoing provisions, neither switches E or A can be closed without first opening the circuit of the winding of the other switch; and further, that the circuit of either switch can not be closed, so long as any arc is being maintained between the main contacts of the other switch, as the solenoid-operated contacts 9 and 13 will hold the circuit open, so long as an arc is maintained at such contacts, and current is flowing through the solenoid winding 10.

The switches C and F are similarly interlocked, as will be readily seen from Fig. 4, without a detailed description thereof.

MR designates a master reverser switch having ahead and reverse positions, respectively. The contacts of this switch in its ahead position close the circuit of a solenoid S, while the contacts in its reverse position close the circuit of the solenoid S'. The solenoids S, S', are connected to the shaft 15, which operates a series of reversing switches RS', RS², RS³, RS⁴, for the respective motors.

It will be unnecesary to trace the circuits in Fig. 4 in the various positions of the several switches, as this can best be done by reference to Fig. 6. To facilitate this, the control wires have been indicated by lighter lines, while the motor circuit wires are indicated by heavier lines. By tracing these circuits, it will be found that the respective positions of the master controller effect the circuit relations shown in Fig. 3.

It will be obvious that instead of employing solenoid-actuated switches, I may employ any other well known or suitable form, and that various other changes may be made in the details of the switch contacts and their wiring connections within the scope of the appended claims.

In describing Fig. 1, it has been assumed that a certain side of the circuit shown is trolley and the other side ground, but it is obvious that it is immaterial which side is considered the supply and which side the return side of the circuit.

The advantages of my invention will be apparent to those skilled in the art, since it provides a method of and means for the control of a plurality of electric motors in which the acceleration of the motors is effected by successive steps, which gradually increase the speed and give easy running and freedom from jerks. The method of changing the motors from series to parallel relation without disconnecting their terminals greatly simplifies the apparatus and circuit connections and reduces the amount of arcing at the switch contacts. These changes are effected without the use of external resistance, such resistance being used only momentarily in starting, and in some cases, even this momentary use may be dispensed with.

I claim:

1. In the control of three or more electric motors, the steps which consist in establishing as many parallel paths through the motors as there are motors, and maintaining a series connection between the motors while establishing such paths, and also maintaining at least two of the motors actively in circuit while establishing said parallel paths; substantially as described.

2. In the control of three or more electric motors, the method which consists in changing the motors from series to parallel relation by successively establishing parallel current paths through the motors and maintaining at least two of the motors actively in circuit throughout said changes, and also maintaining a series connection between the motors until there are as many of such paths as there are motors; substantially as described.

3. The method of controlling electric motors, which consists in connecting a plurality of them in series, then in series-parallel groups, and finally in parallel by establishing parallel circuits which reverse the current flow in some of the motors, and maintaining a series connection between the motors while effecting the circuit changes; substantially as described.

4. The method of controlling electric motors, which consists in connecting a plurality of them in series, then short-circuiting one or more of the motors, then connecting them in series-parallel groups, and then successively connecting them in parallel by establishing parallel circuits which reverse the current flow in some of them, and maintaining a series connection between the motors while effecting the circuit changes; substantially as described.

5. The herein described method of controlling electric motors while permanently connected in series, which consists in short-circuiting two of the motors, then connecting them in series-parallel groups, then short-circuiting one motor of one group and connecting the remaining motor of that group in parallel with the two motors of the other group, then short-circuiting a motor of the other group and placing the remaining two motors in parallel, and finally connecting all four motors in parallel, and effecting said steps while maintaining a series connection of the motors by establishing parallel circuit connections which reverse the flow of current through some of them, substantially as described.

6. The method of controlling a plurality of series-connected electric motors, which consists in short-circuiting some of the motors while leaving the others in series, then connecting the short-circuited motors to ground and thereby forming parallel current paths through the two sets of motors, and maintaining a series connection between all the motors while effecting said changes, and also maintaining at least two of the motors actively in circuit; substantially as described.

7. The method of controlling a plurality of series-connected electric motors, which consists in short-circuiting some of the motors while leaving the other motors in series, connecting the short-circuited motors to ground and thus forming parallel current paths through the two sets of motors, and subsequently increasing the number of parallel paths until there are as many of such paths as there are motors; substantially as described.

8. The combination with three or more electric motors permanently connected in a series, of control apparatus therefor, having contact and circuit connections arranged to establish as many parallel paths through the motors as there are motors, while maintaining a series connection of the motors; substantially as described.

9. The combination with a plurality of electric motors permanently connected in a series, of controlling apparatus therefor having a plurality of contacts, and circuit connections which are arranged to connect the motors in series parallel groups and then in parallel while maintaining their series connections; substantially as described.

10. The combination with a plurality of electric motors connected in a series, of controlling apparatus having switching means arranged to short circuit some of the motors while maintaining their series connection, and other switching means arranged to establish parallel connections therefor between the two terminals of the circuit and of a character to cause a reverse flow of current through some of the motors, some of said switching means being electrically related or interlocked so as to prevent closing of one switch while another is closed, substantially as described.

11. The combination with a plurality of electric motors connected in a series, of controlling apparatus having switching means arranged to short circuit some of the motors while maintaining their series connection, and other switching means arranged to establish parallel connections therefor between the two terminals of the circuit and of a character to cause a reverse flow of current through some of the motors, some of said switching means being related or interlocked so as to prevent closing of one switch while another is closed; substantially as described.

12. The combination with a plurality of electric motors connected in a series, of controlling apparatus having switching means arranged to short circuit some of the motors while maintaining their series connection, and other switching means arranged to establish parallel connections therefor between the two terminals of the circuit and of a character to cause a reverse flow of current through some of the motors, some of said switching means being electrically related or interlocked so as to prevent closing of one switch while current is flowing through another; substantially as described.

In testimony whereof, I have hereunto set my hand.

PEARL N. JONES.

Witnesses:
   Jesse B. Heller,
   Geo. H. Parmelee.